Feb. 13, 1934.     C. TRAUT     1,947,070
DEVICE FOR CONTROLLING TENSION OF SPRING ROLLERS
Filed July 29, 1932
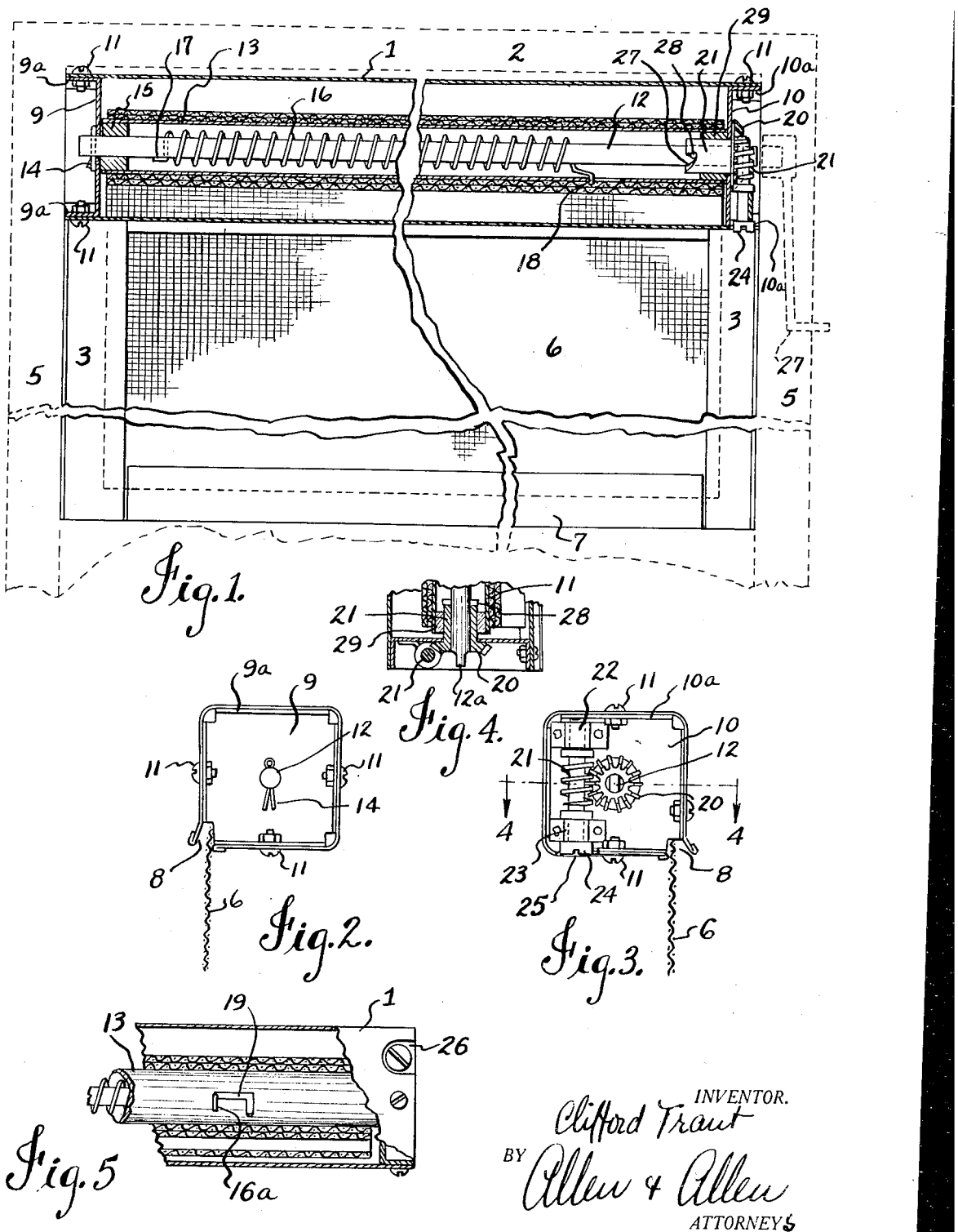

Patented Feb. 13, 1934

1,947,070

UNITED STATES PATENT OFFICE 1,947,070

DEVICE FOR CONTROLLING TENSION OF SPRING ROLLERS

Clifford Traut, Newport, Ky., assignor to The Higgin Manufacturing Company, Newport, Ky., a corporation of West Virginia Application July 29, 1932. Serial No. 625,849

5 Claims. (Cl. 156—39)

My invention relates to rolling closures in general, including, but without limitation, rolling light-tight closures and the like. I shall describe it in connection with a rolling window screen, it being understood that the nature of the flexible closure mechanism is not a limitation upon my invention. The general object of my invention is the provision of means for adjusting the tension of the spring roller upon which the flexible closure is wound. In rolling window screens as ordinarily manufactured the is a roller housing which is placed usually at the top of the window opening. This housing contains a spring roller upon which is wound the closure cloth. Side guides are provided for the window opening in which the edges of the closure cloth may ride, and a draw bar is provided, also riding along the guide to permit the withdrawal of the closure cloth from the housing against the tension of the spring, so as to cause the closure cloth to cover the window opening. Such closures are permanent installations in buildings, and are usually so installed that the housing at least is concealed by the trim of the window. The tension on the spring roller is adjusted prior to the installation of the box or housing. Should it be found after the installation of the screen that the tension is incorrectly adjusted, or should anything go wrong with the tension of the roller, it is necessary to take out the installation. This makes adjustment or repair an inconvenient and expensive operation.

Worm devices have hitherto been proposed in connection with spring rollers to provide for an adjustment of the tension thereof, without the necessity of making the ends of the roller accessible for the direct application of tools. Such proposals have not, however, gone into commercial development for the reasons that they were not economical of construction, and had the fundamental defect of providing the only means whereby the tension could be adjusted. While it is my object to provide means whereby the tension of the spring roller of a rolling closure may be adjusted by means fully accessible when the screen is completely installed, it is also my object to provide for the independent adjustment of tension at the time of installation. Let it be assumed that a worm and worm gear arrangement is provided for adjusting and holding the tension. Under these circumstances the ratio of rotation of the two shafts upon which the worm and gear are located will probably be at least ten to one, and may be twenty to one, or greater. It will be obvious under these circumstances that the worm gear arrangement is highly inconvenient for the making of initial adjustments of tension. Assuming that to make a preliminary tension adjustment thirty turns of the spring roller shaft are necessary, these thirty turns with a gear ratio of twenty to one would require six hundred turns of the worm shaft. This clearly would involve a tedious and inconvenient adjustment operation, and would greatly increase the cost of the assembly of the screen. It is an object of my invention, therefore, to provide means which permit the independent and rapid tensioning or releasing of the spring roller, in combination with independent means which permit the adjustment of the tension thereof when the roller housing is in installed position. Another object of my invention is to provide the structures and advantages aforesaid in that type of roller housing which has recessed ends. Still another object of my invention is the provision of an economical and simplified construction to the ends aforesaid.

These and other objects of my invention which will be set forth hereinafter or will be apparent to one skilled in the art upon reading these specifications, I accomplish by that certain construction and arrangement of parts of which I shall now describe a preferred embodiment, reference being had to the drawing which forms a part hereto, and in which:

Figure 1 is an elevational view of a screen installation, with parts in section.

Fig. 2 is an elevational view of the left hand end of the spring roller housing shown in Fig. 1.

Fig. 3 is an elevational view of the right hand end of the spring roller housing shown in Fig. 1.

Fig. 4 is a sectional view through the end of the roller housing, taken along the lines 4, 4 of Fig. 3.

Fig. 5 is a view of an end of the spring roller housing from beneath, with parts in section.

I have shown in Fig. 1 a spring roller housing 1, positioned adjacent the head 2 of a window opening. Side guide members 3 of any suitable type are positioned adjacent the sides 5 of my window opening. The edges of the screen cloth 6 ride in these side guides, and the lower end of the screen cloth is fastened to an appropriate drawbar 7, as is well known in the art. The screen rolling housing itself does not require special description. It is a tubular member formed of sheet metal, and of generally rectangular shape, having lips as shown in Figs. 2 and 3 defining a longitudinal slot or opening 8, through which the screen cloth 6 may be withdrawn. The ends of the casing or housing 1 are closed by end members indicated, respectively at 9 and 10. These members are generally of tray shape having upstanding side flanges 9a and 10a, respectively. These end members are inserted into the ends of the housing 1 and are held in place by a series of bolts 11, or other suitable fastening members. There are thus provided recesses in the ends of the spring roller housing, and in one of these recesses I locate the controlling mechanism hereinafter to be described.

A shaft 12 runs through the housing; and a roller member 13 of tubular form is positioned over the shaft, and is controlled by a spring. The screen cloth is fastened at one of its ends to this roller member and is wound thereon when taken up into the housing. Ordinarily the shaft 12 is journaled in the end members 9 and 10, and is provided with a ratchet mechanism. It is also connected to the roller 13 by a spring. The roller may thus turn with reference to the fixed shaft, but only against or with the tension of the spring aforesaid. So long as the tension of the spring is properly adjusted there will be a tendency for the roller 13 to rotate with reference to the fixed shaft 12 so as to take up the closure cloth within the housing. In the ordinary construction, the ratchet mechanism permits the turning of the shaft 12 so as to control the tension of the spring.

In my construction the shaft 12 extends through and is journaled in the end member 9 as shown, and is provided with a cotter pin 14 beyond said end member, which holds the end of the casing in position for assembly purposes. The left hand end of the roller 13 is provided with a bushing 15, serving to mount it rotatively upon the shaft 12. A coiled spring 16 is connected as at 17 to the shaft within its left hand end. The right hand end of the spring is connected as at 18 to the roller 13. This connection is conveniently accomplished by providing the spring as shown at 16a in Fig. 5 with a reversely bent portion, and by providing the roller with an L-shaped slot 19. The portion 16a of the spring passes through the transverse leg of this slot, and is engaged in the longitudinal leg thereof. During this operation the spring is stretched, and the consequent tension will maintain the engagement of the portion 16a thereof with the slot aforesaid. The tension of the spring also tends to urge the shaft toward the right in Fig. 1 for a purpose hereinafter to be described.

In the end closure member 10 I journal a gear 20, having a crown portion as shown, and a sleeve portion 21. This gear is merely slipped through a hole in the end member 10, and is retained against displacement by a worm gear 21, which may conveniently be journaled in bearing members 22 and 23, spot welded to the end member 10. The crown portion of the gear 20 is beveled in such a way that when the worm 21 is in place, the gear 20 will be held against endwise displacement. This provides an exceedingly inexpensive, but strong and adequate construction. The worm 21, the bearings 22 and the crown portion of the gear 20 are all contained within the recessed portion of the end member 10, as shown. One of the flanges of this end member is perforated for the passage of one end of the worm 21 as shown at 24, and this portion is slotted transversely as at 25, so that a screw driver or like tool may be engaged therewith for the purpose of rotating the worm. The adjacent end portion of the housing member 1 is cut away to expose the worm portion 24 as shown at 26, and it will be noticed, particularly in Fig. 5, that this end member is accessible from the side of the housing member and therefore will be accessible when the screen is in fully installed position. After the screen has been installed, a screw driver may be engaged in the portion 24, and the tension of the spring adjusted as will hereinafter be made clear.

The sleeve portion 21 of the gear 20 is perforated for the passage of the shaft 12 as shown, and the protruding portion of this shaft may be flattened as at 12a in Fig. 4 so that the usual adjusting handle 27 may be engaged therewith.

The sleeve portion 21 of the crown gear 20 is notched on both sides as at 27, the notches being gently tapered upon one side and abrupt or even reversely curved upon the other.

A pin 28 passes through the shaft 12 and is adapted to be engaged in the notches 27.

It will now be clear from the construction shown, particularly in Fig. 1, that the crown gear 20 may be rotated in a clockwise direction, irrespective of the shaft 12. A counter-clockwise rotation of the gear 20 will, however, produce a corresponding rotation of the shaft 12 because of the positive engagement of the pin 28 in the notches 27. It will finally be clear that the shaft 12 may be disconnected from the gear 20 by depressing it to the left in Fig. 1.

The right hand end of the roller 13 is provided with a bushing 29, which mounts it rotatively with respect to the sleeve 21 of the gear 20.

In the installation of screens provided with my invention, a preliminary adjustment of tension may be secured by an operation with the ordinary handle 27. This is engaged directly with the end of the shaft 12, and when it is rotated in a counter-clockwise direction, the mechanism being as shown in Fig. 1, the shaft 12 will turn with respect to the gear 20, and the tension of the spring 16 will be increased. When, in accordance with the judgment of the operator, sufficient preliminary tension has been placed upon the screen, the rotation of the handle 27 will be stopped, and the pin 28 will engage in the notches 27 of the gear 20 to hold the shaft 12 against rotation. This action will be positive because the shaft 12 is being urged to the right by the spring 16. Should too much tension have been placed on the spring 16, it will be possible to release this tension by pushing on the right hand end of the shaft 12 so as to send it to the left, whereupon the pin 28 will come out of engagement with the notches 27 and the shaft 12 will rotate to release the tension under the influence of spring 16.

Thus, as in common practice, the workman installing the screen will adjust the tension in a preliminary way by means of the usual handle. This may be done very quickly because the handle is directly connected to the shaft 12. After the tension has been adjusted in accordance with the desires or judgment of the operator, the screen is then completely installed. If the tension is found to be proper, no further adjustment need be made. If it is found to be improper, then an adjustment may readily be made without demounting the screen by merely engaging a screw driver, or the like, in the notch of the accessible end 24 of the worm gear 21 and turning it in a clockwise direction to release the tension or in a counter-clockwise direction to increase the tension. Due to the preliminary adjustment with the handle 27, this adjustment will not be a tedious or lengthy operation, and the cost of installing and maintaining closures of this character will obviously be greatly lessened.

Modifications may be made in the exemplary embodiment of my structure which I have described without departing from the spirit of my invention.

Having thus described my invention, what I claim as new and desire to secure by Letters Patent, is:—

1. In a tension controlling device, in combination with a spring roller, shaft and housing, an end closure member, a gear mounted for rotation with respect to said closure member, a worm gear meshing with said first gear, and mounted for rotation with respect to said closure member, the axis of said worm gear being substantially parallel to the body of said closure member, an end portion of said worm gear being engagable for rotation by a tool located to one side of said housing, and a motion transmitting connection between said first mentioned gear and the shaft of said spring roller, said first mentioned gear having a sleeve surrounding said shaft, notches in said sleeve having tapering portions and shoulder portions, and a pin in said shaft to engage in said notches.

2. In combination with a spring roller, shaft and housing, means for adjusting the tension of said roller from positions other than in line with the ends of said housing, comprising a self-locking gear arrangement having a portion accessible for operation from the side of said housing, and a portion having operative engagement with said shaft, and disengageable means operatively engaging said shaft whereby said shaft may be disengaged for independent rotation of said shaft.

3. In combination with a spring roller, shaft and housing, means for adjusting the tension of said roller from positions other than in line with the ends of said housing, comprising a self-locking gear arrangement having a portion accessible for operation from the side of said housing, and a portion having operative engagement with said shaft, and disengageable means operatively engaging said shaft whereby said shaft may be disengaged for independent rotation of said shaft, said last mentioned means comprising a ratchet connection.

4. In combination with a spring roller, a shaft and housing, and an end closure member of the recessed type for said housing, a worm and gear located in the recessed portion of said closure member, said worm being accessible from the side of said closure member, said gear having an operative connection with said shaft, said gear being of the bevel type, said worm having a portion extending over the beveled portion of said gear to retain said gear in place, said operative connection being disengageable, and means for urging said shaft resiliently toward said gear.

5. In combination with a spring roller, shaft and housing, a gear, a ratchet connection between said gear and said shaft, said connection being releasable, and a tension spring connecting said roller and said shaft so as to urge said shaft into contact with said gear.

CLIFFORD TRAUT.